(12) United States Patent
Lederer et al.

(10) Patent No.: US 9,206,304 B2
(45) Date of Patent: Dec. 8, 2015

(54) AUTOMOTIVE INTERIOR COMPOUND

(75) Inventors: Klaus Lederer, Linz (AT); Erwin Kastner, Linz (AT)

(73) Assignee: Borealis AG, Vienna (AT)

( * ) Notice: Subject to any disclaimer, the term of this patent is extended or adjusted under 35 U.S.C. 154(b) by 318 days.

(21) Appl. No.: 13/639,961

(22) PCT Filed: Apr. 15, 2011

(86) PCT No.: PCT/EP2011/056002
§ 371 (c)(1),
(2), (4) Date: Jan. 8, 2013

(87) PCT Pub. No.: WO2011/131579
PCT Pub. Date: Oct. 27, 2011

(65) Prior Publication Data
US 2013/0123413 A1  May 16, 2013

(30) Foreign Application Priority Data

Apr. 20, 2010  (EP) .................................... 10160393

(51) Int. Cl.
*C08L 23/14* (2006.01)
*C08L 23/10* (2006.01)
*C08K 3/00* (2006.01)
*C08L 23/06* (2006.01)
*C08L 23/16* (2006.01)
*C08L 53/00* (2006.01)

(52) U.S. Cl.
CPC .............. *C08L 23/10* (2013.01); *C08K 3/0033* (2013.01); *C08L 23/06* (2013.01); *C08L 23/16* (2013.01); *C08L 53/00* (2013.01); *C08L 2205/03* (2013.01); *C08L 2205/035* (2013.01); *C08L 2207/02* (2013.01); *C08L 2308/00* (2013.01)

(58) Field of Classification Search
CPC ..... C08L 2207/02; C08L 23/10; C08L 53/00; C08L 2205/035; C08K 3/0033
See application file for complete search history.

(56) References Cited

U.S. PATENT DOCUMENTS

| | | | |
|---|---|---|---|
| 6,214,934 B1 * | 4/2001 | Moriya et al. | 525/89 |
| 2005/0075457 A1 * | 4/2005 | Koschmieder et al. | 525/191 |
| 2005/0075458 A1 * | 4/2005 | Salek et al. | 525/240 |
| 2007/0240605 A1 * | 10/2007 | Iyer et al. | 106/31.6 |
| 2008/0045638 A1 * | 2/2008 | Chapman et al. | 524/425 |

FOREIGN PATENT DOCUMENTS

| | | |
|---|---|---|
| EP | 2036947 A1 | 3/2009 |
| WO | 8707620 A1 | 12/1987 |
| WO | WO 8707620 A1 | 12/1987 |
| WO | 9219653 A1 | 11/1992 |
| WO | 9219658 A1 | 11/1992 |
| WO | WO 9219653 A1 | 11/1992 |
| WO | WO 9219658 A1 | 11/1992 |
| WO | 9924478 A1 | 5/1999 |
| WO | 9924479 A1 | 5/1999 |
| WO | WO 9924478 A1 | 5/1999 |
| WO | WO 9924479 A1 | 5/1999 |
| WO | 0068315 A1 | 11/2000 |
| WO | WO 0068315 A1 | 11/2000 |
| WO | 04000899 A1 | 12/2003 |
| WO | WO 2004000899 A1 | 12/2003 |
| WO | 2004111095 A1 | 12/2004 |
| WO | WO 2004111095 A1 | 12/2004 |
| WO | 2008020925 A1 | 2/2008 |
| WO | WO 2008020925 A1 | 2/2008 |

OTHER PUBLICATIONS

International Search Report and Written Opinion for International Application No. PCT/EP2011/056002 Filed Apr. 15, 2011.
Stefan Berger & Siegmar Braun, 200 and More NMR Experiments—A Practical Course, 18-23, 48-53, 128-131, 144-149, 160-163, 302-305, and 318-321, 2004, WILEY-VCH Verlag GmbH & Co. KGaA, Weinhim.
Vincenzo Busico & Roberta Cipullo, Microstructure of Polypropylene, Progress in Polymer Science, 2001, pp. 443-533, Elsevier Science Ltd.
Thomas Koch& Doris Machl, Test Method—Evaluation of Scratch Resistance in Multiphase PP Blends, Polymer Testing, 2007, pp. 927-936, Elsevier Science Ltd.
Stefan Berger, Siegmar Braun, 200 and More NMR Experiments, 2004, pp. 18-23, 48-53, 128-131, 144-149, 160-163, 302-305, 318-321, Wiley-VCH Verlag GmbH & Co., KGaA,. Weinheim.
Vincenzo Busico, Roberta Cipullo, Microstructure of Polypropylene, Progress in Polymer Science, 2001, pp. 443-533, Elsevier Science Ltd.
Thomas Koch, Doris Machl,. Evaluation of Scratch Resistance in Multiphase PP Blends, Science Direct, Polymer Testing 26, 2007, pp. 927-936, Elsevier Science Ltd.

* cited by examiner

*Primary Examiner* — Wenwen Cai
(74) *Attorney, Agent, or Firm* — Warn Partners, P.C.

(57) ABSTRACT

Composition having a melt flow rate $MFR_2$ (230° C.) measured according to ISO 1133 in the range of 15 to 30 g/10 min, said composition comprises a heterophasic propylene copolymer (H-PP1), a high melt flow polypropylene (HMF-PP), a styrenic block copolymer (SBC) and a mineral filler (F), wherein (a) the heterophasic propylene copolymer (H-PP1) has a xylene cold soluble (XCS) content measured according to ISO 6427 in the range of 22.0 to 50.0 wt.-% and comprises (a1) a polypropylene matrix (M1) and (a2) an elastomeric copolymer (E1) comprising units derived from propylene and ethylene and/or $C_4$ to $C_{12}$ α-olefin, (b) the melt flow rate $MFR_2$ (230° C.) measured according to ISO 1133 of the high melt flow polypropylene (HMF-PP) is higher than the melt flow rate $MFR_2$ (230° C.) measured according to ISO 1133 of the heterophasic propylene copolymer (H-PP1), and (c) the high melt flow polypropylene (HMF-PP) has melt flow rate $MFR_2$ (230° C.) measured according to ISO 1133 of at least 40.0 g/10 min.

14 Claims, 2 Drawing Sheets

Figure 1: Material "E3": Multiaxial impact curve at +23°C, 6,6 m/s according to ASTM D3763, (ø100x3mm)

Figure 2: Material "E3": Multiaxial impact curve at -30°C, 6,6 m/s according to ASTM D3763. (ø100x3mm)

Figure 3: Material "CE1": Multiaxial impact curve at - 30°C, 6,6 m/s according to ASTM D3763. (ø100x3mm)

Figure 4: Material "CE2": Multiaxial impact curve at - 30°C, 6,6 m/s according to ASTM D3763. (ø100x3mm)

AUTOMOTIVE INTERIOR COMPOUND

CROSS REFERENCE TO RELATED APPLICATIONS

This application is a National Stage of International Application No. PCT/EP2011/056002, filed Apr. 15, 2011. This application claims priority to European Patent Application No. 10160393.4 filed on Apr. 20, 2010. The disclosures of the above applications are incorporated herein by reference.

The present invention is directed to a new propylene composition suitable for the automobile industry.

Polypropylene is nowadays the polymer of choice for automobile parts like bumpers, doorpanels, and dash boards. In particular heterophasic propylene copolymers (HECO's) are suitable as they combine stiffness with good impact behavior. Heterophasic propylene copolymers (HECO's) are well known in the art. Such heterophasic propylene copolymers (HECO's) comprise a matrix being either a propylene homopolymer or a random propylene copolymer in which an elastomeric copolymer is dispersed. Thus the polypropylene matrix contains (finely) dispersed inclusions being not part of the matrix and said inclusions contain the elastomeric copolymer. The term inclusion indicates that the matrix and the inclusion form different phases within the heterophasic propylene copolymer (HECO), said inclusions are for instance visible by high resolution microscopy, like electron microscopy or scanning force microscopy.

Even though the heterophasic propylene copolymers on the market achieve very good balance between stiffness and impact, the profile requirements for such systems become ever more demanding. For instance nowadays the automobile industry requires polymer materials with ultra high impact performance and full ductile failure behavior by keeping the stiffness on a very high level.

However such demanding properties cannot be fulfilled by classical heterophasic propylene copolymers.

Accordingly, the object of the present invention is to provide a polymer composition exhibiting an impact behavior of at least 5.0 kJ/m² (Izod notched at −30° C.), a full ductile failure behavior at high speed multiaxial impact test as well as a stiffness (flexural modulus) of at least 1750 MPa. Additionally the polymer composition shall have rather high melt flow rate and preferably a superior scratch resistance.

The finding of the present invention is that a composition must be provided comprising a heterophasic propylene copolymer, a high melt flow component, a styrenic block copolymer, and a mineral filler having preferably a high aspect ratio.

Accordingly the present invention is directed to a composition having a melt flow rate $MFR_2$ (230° C.) measured according to ISO 1133 in the range of 15 to 30 g/10 min, said composition comprises a heterophasic propylene copolymer (H-PP1), a high melt flow polypropylene (HMF-PP), a styrenic block copolymer (SBC) and a mineral filler (F), wherein
(a) the heterophasic propylene copolymer (H-PP1) has a xylene cold soluble (XCS) content measured according to ISO 6427 in the range of 22.0 to 50.0 wt.-% and comprises
   (a1) a polypropylene matrix (M1) and
   (a2) an elastomeric copolymer (E1) comprising units derived from
      propylene and
      ethylene and/or $C_4$ to $C_{12}$ α-olefin,
(b) the melt flow rate $MFR_2$ (230° C.) measured according to ISO 1133 of the high melt flow polypropylene (HMF-PP) is higher than the melt flow rate $MFR_2$ (230° C.) measured according to ISO 1133 of the heterophasic propylene copolymer (H-PP1), and
(c) the high melt flow polypropylene (HMF-PP) has melt flow rate $MFR_2$ (230° C.) measured according to ISO 1133 of at least 40.0 g/10 min.

Preferably the composition comprises additionally a high density polyethylene (HDPE).

More precisely the present invention is directed to a composition having a melt flow rate $MFR_2$ (230° C.) measured according to ISO 1133 in the range of 15 to 30 g/10 min, said composition comprises
   20 to 40 wt.-%, preferably 25 to 35 wt.-%, of a heterophasic polypropylene (H-PP1),
   17 to 38 wt.-%, preferably 22 to 30 wt.-%, of a high melt flow polypropylene (HMF-PP),
   7 to 25 wt.-%, preferably 12 to 20 wt.-%, of a styrenic block copolymer (SBC)
   optionally 2 to 10 wt.-%, more preferably 3 to 7 wt.-%, of a high density polyethylene (HDPE), and
   15 to 30 wt.-%, preferably 15 to 25 wt.-%, of a mineral filler (F),
based on the composition, more preferably based on the components H-PP1, HMF-PP, SBC; HDPE, and F,
wherein
(a) the heterophasic propylene copolymer (H-PP1) has a xylene cold soluble (XCS) content measured according to ISO 6427 in the range of 22.0 to 50.0 wt.-% and comprises
   (a1) a polypropylene matrix (M1) and
   (a2) an elastomeric copolymer (E1) comprising units derived from
      propylene and
      ethylene and/or $C_4$ to $C_{12}$ α-olefin,
(b) the melt flow rate $MFR_2$ (230° C.) measured according to ISO 1133 of the high melt flow polypropylene (HMF-PP) is higher than the melt flow rate $MFR_2$ (230° C.) measured according to ISO 1133 of the heterophasic propylene copolymer (H-PP1), and
(c) the high melt flow polypropylene (HMF-PP) has melt flow rate $MFR_2$ (230° C.) measured according to ISO 1133 of at least 40.0 g/10 min.

It is apparent from the wording used for the different polymers (H-PP1, HMF-PP, SBC and HDPE) according to the present invention that they must (chemically) differ from each other.

The expression "heterophasic" indicates that an elastomeric copolymer is (finely) dispersed in a matrix. In other words the elastomeric copolymer forms inclusions in the matrix. Thus the matrix contains (finely) dispersed inclusions being not part of the matrix and said inclusions contain the elastomeric copolymer. The term "inclusion" according to this invention shall preferably indicate that the matrix and the inclusion form different phases within the heterophasic propylene copolymer, said inclusions are for instance visible by high resolution microscopy, like electron microscopy or scanning force microscopy. The final composition is probably of a complex structure. Probably the matrix of the heterophasic propylene copolymers form a continuous phase being the matrix of the composition wherein the elastomeric copolymer(s), the styrenic block copolymer (SBC), and optionally the high density polyethylene (HDPE) form together or individually inclusions dispersed therein.

Additionally the inclusions of the final composition may also contain the mineral filler (F); however preferably the mineral filler (F) forms separate inclusions within the matrix.

In another embodiment the matrix contains (finely) dispersed inclusions being not part of the matrix and said inclusions contain the elastomeric copolymer(s) and the styrenic block copolymer (SBC). In such a case the styrenic block copolymer (SBC) may preferably form on its part inclusions (finely dispersed) within in the elastomeric copolymer (s).

Further the composition according to the present invention comprises preferably the heterophasic propylene copolymer (H-PP1), the high melt flow polypropylene (HMF-PP), the styrenic block copolymer (SBC), and optionally the high density polypropylene (HDPE) as the only polymer components within the composition. In other words the instant invention may contain further additives, like the mineral filler (F) but no other polymer in an amount exceeding 8 wt-%, more preferably exceeding 5 wt.-%, like exceeding 3 wt.-%, based on the total composition. One additional polymer which may be present in such low amounts is a polyethylene which is a by-reaction product obtained by the preparation of heterophasic propylene copolymers (see in detail below) or a polyethylene originating from masterbatches for pigments.

It has been surprisingly found out that the composition according to this invention possess extremely high impact paired with full ductile failure behavior at high speed multi-axial impact test at very low temperatures. Further the composition shows very high stiffness and outstanding scratch resistance (see example section).

BRIEF DESCRIPTION OF THE DRAWINGS

The present invention will become more fully understood from the detailed description and the accompanying drawings, wherein.

Figure 1:
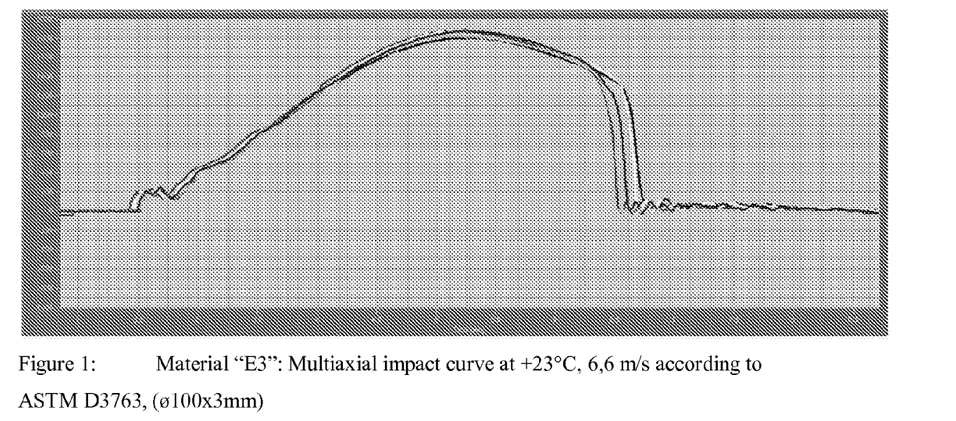
FIG. 1 shows a multi-axial impact curve at +23° C. of the inventive material "E3" at 6.6 m/sec according to ASTMD3763, (Ø100×3 mm)
Figure 2:
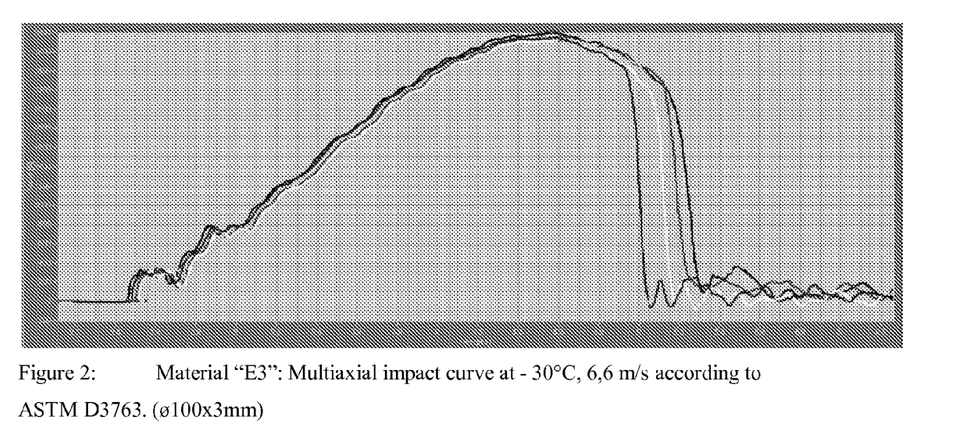
FIG. 2 shows a multi-axial impact curve at −30° C. of the inventive material "E3" at 6.6 m/sec according to ASTMD3763, (Ø100×3 mm)
Figure 3:
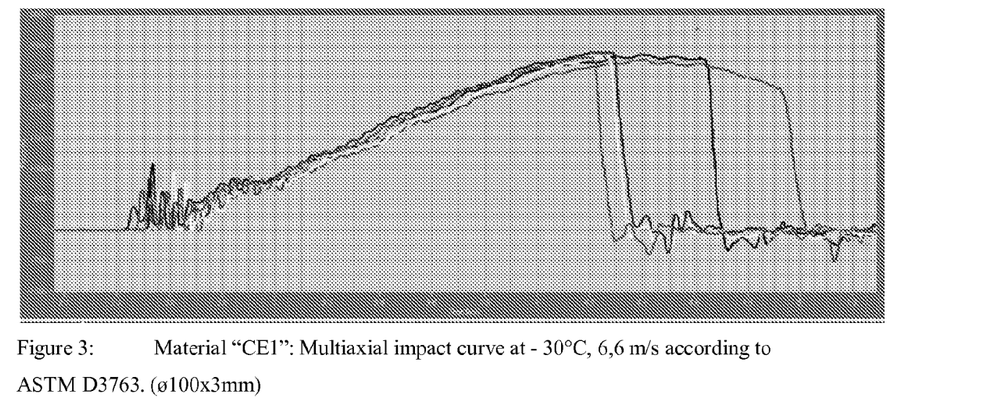
FIG. 3 shows a multi-axial impact curve at −30° C. of the comparative material "CE1" at 6.6m/sec according to ASTMD3763, (Ø100×3 mm)
Figure 4:
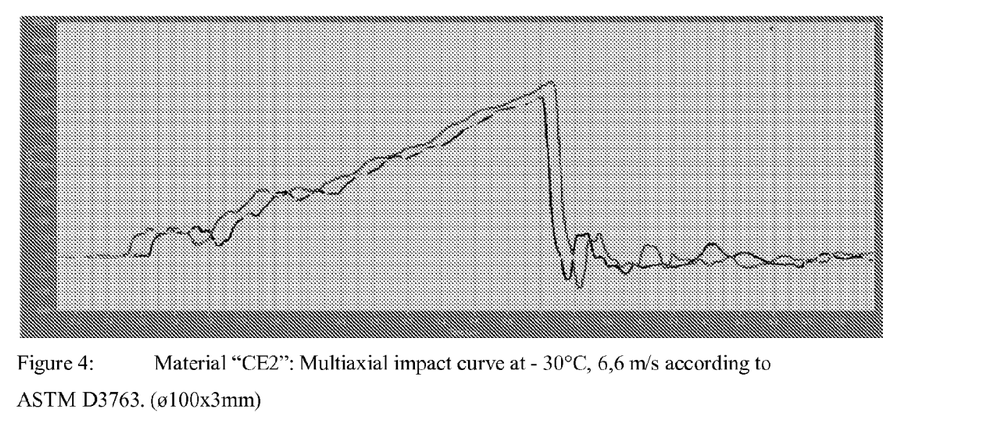
FIG. 4 shows a multi-axial impact curve at −30° C. of the comparative material "CE2" at 6.6m/sec according to ASTMD3763, (Ø100×3 mm).

The present invention will be now described in more detail.

One requirement is that the final composition has a rather high melt flow rate. The melt flow rate mainly depends on the average molecular weight. This is due to the fact that long molecules render the material a lower flow tendency than short molecules. An increase in molecular weight means a decrease in the MFR-value. The melt flow rate (MFR) is measured in g/10 min of the polymer discharged through a defined die under specified temperature and pressure conditions and the measure of viscosity of the polymer which, in turn, for each type of polymer is mainly influenced by its molecular weight but also by its degree of branching. The melt flow rate measured under a load of 2.16 kg at 230° C. (ISO 1133) is denoted as $MFR_2$ (230° C.). Accordingly, it is preferred that in the present invention the composition has a melt flow rate $MFR_2$ (230° C.) in a range of 15.0 to 30.0 g/10 min, preferably of 17.0 to 28.0 g/10 min.

Further, to obtain the desired melt flow properties of the composition a polymer with rather high melt flow rate must be present. Accordingly the inventive composition comprises a high meltflow propylene copolymer (HMF-PP) having a melt flow rate $MFR_2$ (230° C.) of at least 40 g/10 min, preferably a melt flow rate $MFR_2$ (230° C.) in the range of 40.0 to 1000.0 g/10 min, more preferably in the range of 60.0 to 500.0 g/10 min, still more preferably in the range of 70 to 200 g/10 min. In a preferred embodiment the high meltflow propylene copolymer (HMF-PP) is not degraded. In a specific embodiment the high meltflow propylene copolymer (HMF-PP) is a heterophasic propylene copolymer (H-PP1) as defined in detail below.

Further the high meltflow propylene copolymer (HMF-P) differ inter alia from the heterophasic propylene copolymer (H-PP1) by its melt flow behavior. Therefore one further requirement according to this invention is that the melt flow rate $MFR_2$ (230° C.) of the high meltflow propylene copolymer (HMF-PP) is higher than the melt flow rate $MFR_2$ (230° C.) of the heterophasic propylene copolymer (H-PP1). More specifically it is appreciated that the melt flow rate $MFR_2$ (230° C.) of the high meltflow propylene copolymer (HMF-PP) is at least 30 g/10 min, more preferably at least 50 g/10 min, higher than the melt flow rate $MFR_2$ (230° C.) of the heterophasic propylene copolymer (H-PP1). Accordingly it is in particular appreciated that the ratio of the melt flow rate $MFR_2$ (230° C.) of the heterophasic propylene copolymer (H-PP1) to the melt flow rate $MFR_2$ (230° C.) of the high meltflow propylene copolymer (HMF-PP) [MFR(H-PP1)/MFR(HMF-PP)] is in the range of 1:4 to 1:80, more preferably in the range of 1:5 to 1:50).

The heterophasic propylene copolymer (H-PP1) is a typical material used in this technical field. Accordingly the heterophasic propylene copolymer (H-PP1) has preferably a melt flow rate $MFR_2$ (230° C.) in the range of 3.0 to 30.0 g/10 min, more preferably in the range of 7.0 to 20.0 g/10 min, still more preferably in the range of 9.0 to 15.0 g/10 min.

As stated above the heterophasic propylene copolymer (H-PP1) according to this invention comprises
(a) a polypropylene matrix (M1) and
(b) an elastomeric copolymer (E1) comprising units derived from
propylene and
ethylene and/or $C_4$ to $C_{12}$ α-olefin.

Preferably the propylene content in the heterophasic propylene copolymer (H-PP1) is 75.0 to 92.0 wt.-%, more preferably 80.0 to 90.0 wt.-%, based on the total heterophasic propylene copolymer (H-PP1), more preferably based on amount of the polymer components of the heterophasic propylene copolymer (H-PP1), yet more preferably based on the amount of the matrix (M1) and the elastomeric copolymer (E1) together. The remaining part constitute the comonomers different from propylene (ethylene and/or $C_4$ to $C_{12}$ α-olefin), preferably constitutes ethylene.

As defined herein a heterophasic propylene copolymer (H-PP1) comprises as polymer components only the polypropylene matrix (M1) and the elastomeric copolymer (E1). In other words the heterophasic propylene copolymer (H-PP1) may contain further additives but no other polymer in an amount exceeding 5 wt-%, more preferably exceeding 3 wt.-%, like exceeding 1 wt.-%, based on the total heterophasic propylene copolymer (H-PP1), more preferably based on the polymers present in the heterophasic propylene copolymer (H-PP1). One additional polymer which may be present in such low amounts is a polyethylene which is a reaction product obtained by the preparation of the heterophasic propylene copolymer (H-PP1). Accordingly it is in particular appreciated that a heterophasic propylene copolymer (H-PP1) as defined in the instant invention contains only a polypropylene matrix (M1), an elastomeric copolymer (E1) and optionally a polyethylene in amounts as mentioned in this paragraph.

Further, throughout the present invention the xylene cold insoluble (XCI) fraction of the heterophasic propylene copolymer (H-PP1) represents the matrix (M1) and optionally the polyethylene whereas the xylene cold soluble (XCS) fraction represents the elastomeric part of the heterophasic propylene copolymer (H-PP1), i.e. the elastomeric copolymer (E1).

Accordingly the matrix (M1) content, i.e. the xylene cold insoluble (XCI) content, in the heterophasic propylene copolymer (H-PP1) is preferably in the range of 50.0 to 78.0 wt.-%, more preferably in the range of 55.0 to 75.0 wt.-%. In case polyethylene is present in the heterophasic propylene copolymer (H-PP1), the values for the matrix (M1) content but not for the xylene cold insoluble (XCI) content may be a bit decreased.

On the other hand the elastomeric copolymer (E1) content, i.e. the xylene cold soluble (XCS) content, in the heterophasic propylene copolymer (H-PP1) is preferably in the range of 22.0 to 50.0 wt.-%, more preferably in the range of 25.0 to 45.0 wt.-%.

The polypropylene matrix (M1) is preferably a random propylene copolymer (R1) or a propylene homopolymer (H1), the latter especially preferred.

Accordingly the comonomer content of the polypropylene matrix (M1) is equal or below 1.0 wt.-%, yet more preferably not more than 0.8 wt.-%, still more preferably not more than 0.5 wt.-%, like not more than 0.2 wt.-%.

As mentioned above the polypropylene matrix (M1) is preferably a propylene homopolymer (H1).

The expression propylene homopolymer used in the instant invention relates to a polypropylene that consists substantially, i.e. of more than 99.7 wt.-%, still more preferably of at least 99.8 wt.-%, of propylene units. In a preferred embodiment only propylene units in the propylene homopolymer are detectable. The comonomer content can be determined with FT infrared spectroscopy, as described below in the examples.

In case the polypropylene matrix (M1) is a random propylene copolymer (R1) it is appreciated that the random propylene copolymer (R1) comprises monomers copolymerizable with propylene, for example comonomers such as ethylene and/or $C_4$ to $C_{12}$ α-olefins, in particular ethylene and/or $C_4$ to $C_8$ α-olefins, e.g. 1-butene and/or 1-hexene. Preferably the random propylene copolymer (R1) according to this invention comprises, especially consists of, monomers copolymerizable with propylene from the group consisting of ethylene, 1-butene and 1-hexene. More specifically the random propylene copolymer (R1) of this invention comprises—apart from propylene—units derivable from ethylene and/or 1-butene. In a preferred embodiment the random propylene copolymer (R1) comprises units derivable from ethylene and propylene only.

Additionally it is appreciated that the random propylene copolymer (R1) has preferably a comonomer content in the range of more than 0.3 to 1.0 wt.-%, more preferably in the range of more than 0.3 to 0.8 wt.-%, yet more preferably in the range of 0.3 to 0.7 wt.-%.

The term "random" indicates that the comonomers of the random propylene copolymers (R1) and (R2) are randomly distributed within the propylene copolymers. The term random is understood according to IUPAC (Glossary of basic terms in polymer science; IUPAC recommendations 1996).

The polypropylene matrix (M1) of the heterophasic propylene copolymer (H-PP1), preferably the polypropylene matrix (M1) being the propylene homopolymer (H1), can be multimodal or bimodal in view of the molecular weight.

The expression "multimodal" or "bimodal" used throughout the present invention refers to the modality of the polymer, i.e.
the form of its molecular weight distribution curve, which is the graph of the molecular weight fraction as a function of its molecular weight,
and/or
the form of its comonomer content distribution curve, which is the graph of the comonomer content as a function of the molecular weight of the polymer fractions.

As will be explained below, the heterophasic propylene copolymers as well their individual components (matrix and elastomeric copolymer) can be produced by blending different polymer types, i.e. of different molecular weight and/or comonomer content. However it is preferred that the heterophasic propylene copolymers as well their individual components (matrix and elastomeric copolymer) are produced in a sequential step process, using reactors in serial configuration and operating at different reaction conditions. As a consequence, each fraction prepared in a specific reactor will have its own molecular weight distribution and/or comonomer content distribution.

Further it is appreciated that the polypropylene matrix (M1) of the heterophasic propylene copolymer (H-PP1) has a moderate melt flow $MFR_2$ (230° C.). As stated above the melt flow rate $MFR_2$ (230° C.) of the polypropylene matrix (M1) equates with the melt flow rate $MFR_2$ (230° C.) of the xylene cold insoluble (XCI) fraction of the heterophasic propylene copolymer (H-PP1). Thus it is preferred that the xylene cold insoluble (XCI) fraction of the heterophasic propylene copolymer (H-PP1) has a melt flow rate $MFR_2$ (230° C.) measured according to ISO 1133 of 20.0 to 150.0 g/10 min, more preferably of 25.0 to 90.0 g/10 min, still more preferably of 30.0 to 75.0 g/10 min.

Preferably the polypropylene matrix (M1) is isotactic. Accordingly it is appreciated that the polypropylene matrix (M1) has a rather high pentad concentration, i.e. higher than 80%, more preferably higher than 85%, yet more preferably higher than 90%, still more preferably higher than 92%, still yet more preferably higher than 93%, like higher than 95%.

The second component of the heterophasic propylene copolymer (H-PP1) is the elastomeric copolymer (E1).

The elastomeric copolymer (E1) comprises, preferably consists of, units derivable from (i) propylene and (ii) ethylene and/or at least another $C_4$ to $C_{12}$ α-olefin, like $C_4$ to $C_{10}$ α-olefin, more preferably units derivable from (i) propylene and (ii) ethylene and at least another α-olefin selected form the group consisting of 1-butene, 1-pentene, 1-hexene, 1-heptene and 1-octene. The elastomeric copolymer (E1) may additionally contain units derived from a conjugated diene, like butadiene, or a non-conjugated diene, however it is preferred that the elastomeric copolymer (E1) consists of units derivable from (i) propylene and (ii) ethylene and/or $C_4$ to $C_{12}$ α-olefins only. Suitable non-conjugated dienes, if used, include straight-chain and branched-chain acyclic dienes, such as 1,4-hexadiene, 1,5-hexadiene, 1,6-octadiene, 5-methyl-1,4-hexadiene, 3,7-dimethyl-1,6-octadiene, 3,7-dimethyl-1,7-octadiene, and the mixed isomers of dihydromyrcene and dihydro-ocimene, and single ring alicyclic dienes such as 1,4-cyclohexadiene, 1,5-cyclooctadiene, 1,5-cyclododecadiene, 4-vinyl cyclohexene, 1-allyl-4-isopropylidene cyclohexane, 3-allyl cyclopentene, 4-cyclohexene and 1-isopropenyl-4-(4-butenyl)cyclohexane. Multi-ring alicyclic fused and bridged ring dienes are also suitable including tetrahydroindene, methyltetrahydroindene, dicyclopentadiene, bicyclo(2,2,1)hepta-2,5-diene, 2-methyl bicycloheptadiene, and alkenyl, alkylidene, cycloalkenyl and cycloalkylidene norbornenes, such as 5-methylene-2-norbornene, 5-isopropylidene norbornene, 5-(4-cyclopentenyl)-2-norbornene; and 5-cyclohexylidene-2-norbornene. Preferred non-conjugated dienes are 5-ethylidene-2-norbornene, 1,4-hexadiene and dicyclopentadiene.

Accordingly the elastomeric copolymer (E1) comprises at least units derivable from propylene and ethylene and may comprise other units derivable from a further α-olefin as defined in the previous paragraph. However it is in particular preferred that elastomeric copolymer (E1) comprises units only derivable from propylene and ethylene and optionally a conjugated diene, like butadiene, or a non-conjugated diene as defined in the previous paragraph, like 1,4-hexadiene. Thus an ethylene propylene non-conjugated diene monomer polymer (EPDM1) and/or an ethylene propylene rubber (EPR1) as elastomeric copolymer (E1) is especially preferred, the latter most preferred.

Like the polypropylene matrix (M1) the elastomeric copolymer (E1) can be unimodal or multimodal, like bimodal, the latter being preferred. Concerning the definition of unimodal and multimodal, like bimodal, it is referred to the definition above.

In the present invention the content of units derivable from propylene in the elastomeric copolymer (EP1) equates with the content of propylene detectable in the xylene cold soluble (XCS) fraction. Accordingly the propylene detectable in the xylene cold soluble (XCS) fraction ranges from 50.0 to 75.0 wt.-%, more preferably 55.0 to 70.0 wt-%. Thus in a specific embodiment the elastomeric copolymer (E1), i.e. the xylene cold soluble (XCS) fraction, comprises from 25.0 to 50.0 wt.-%, more preferably 30.0 to 45.0 wt.-%, units derivable from ethylene and/or at least another $C_4$ to $C_{12}$ α-olefin. Preferably the elastomeric copolymer (E1) is an ethylene propylene non-conjugated diene monomer polymer (EPDM1) or an ethylene propylene rubber (EPR1), the latter especially preferred, with a propylene and/or ethylene content as defined in this paragraph.

A further preferred requirement of the present invention is that the intrinsic viscosity (IV) of the xylene cold soluble (XCS) fraction of the heterophasic propylene copolymer (H-PP1) is rather high. Rather high values of intrinsic viscosity (IV) improve the impact strength. Accordingly it is appreciated that the intrinsic viscosity of the xylene cold soluble (XCS) fraction of the heterophasic propylene copolymer (H-PP1) is above 2.0 dl/g, more preferably at least 2.3 dl/g. On the other hand the intrinsic viscosity (IV) should be not too high otherwise the flowability is decreased. Thus the intrinsic viscosity of the xylene cold soluble (XCS) fraction of the heterophasic propylene copolymer (H-PP1) is preferably in the range of 2.0 to 4.5 dl/g, more preferably in the range 2.3 to 4.1 dl/g. The intrinsic viscosity is measured according to ISO 1628 in decaline at 135° C.

Preferably the heterophasic propylene copolymer (H-PP1) is α-nucleated. Examples of suitable α-nucleating agents are inorganic additives such as talc, silica or kaolin, salts of monocarboxylic or polycarboxylic acids, e.g. sodium benzoate or aluminum tert-butylbenzoate, dibenzylidenesorbitol or its $C_1$-$C_8$-alkyl-substituted derivatives such as methyldibenzylidenesorbitol, ethyldibenzylidenesorbitol or dimethyldibenzylidenesorbitol or salts of diesters of phosphoric acid, e.g. sodium 2,2'-methylenebis(4,6,-di-tert-butylphenyl)phosphate or nonitol derivatives like 1,2,3-trideoxy-4,6:5,7-bis-O[(4-propylphenyl)methylene]-nonitol.

Preferred α-nucleating agents are selected from the group consisting of
(i) salts of monocarboxylic acids and polycarboxylic acids, e.g. sodium benzoate or aluminum tert-butylbenzoate, and
(ii) dibenzylidenesorbitol (e.g. 1,3:2,4 dibenzylidenesorbitol) and $C_1$-$C_8$-alkyl-substituted dibenzylidenesorbitol derivatives, such as methyldibenzylidenesorbitol, ethyldibenzylidenesorbitol or dimethyldibenzylidenesorbitol (e.g. 1,3:2,4 di(methylbenzylidene)sorbitol), nonito-1,2,3,-trideoxy-4,6:5,7-bis-O-[(4-propylphenyl)methylene]-nonitol, and
(iii) salts of diesters of phosphoric acid, e.g. sodium 2,2'-methylenebis(4,6,-di-tert-butylphenyl)phosphate or aluminium-hydroxy-bis[2,2'-methylene-bis(4,6-di-t-butylphenyl)phosphate], and
(iv) vinylcycloalkane polymer and vinylalkane polymer.

The nucleating agent content of the heterophasic propylene copolymer (H-PP1) is preferably up to 5 wt.-%.

Such additives are generally commercially available and are described, for example, in Gachter/Muller, Plastics Additives Handbook, 4th Edition, Hansa Publishers, Munich, 1993.

In a preferred embodiment, the heterophasic propylene copolymer (H-PP1) of the present invention contain from 0.1 to 1 wt.-%, preferably from 0.15 to 0.25 wt.-%, of a nucleating agent, in particular salts of diesters of phosphoric acid, e.g. sodium 2,2'-methylenebis(4,6,-di-tert-butylphenyl) phosphate or aluminium-hydroxy-bis[2,2'-methylene-bis(4,6-di-t-butylphenyl)phosphate]. In another preferred embodiment the heterophasic propylene copolymer (H-PP1) is BNT nucleated as mentioned below.

As mentioned above as a further polymer component a high meltflow polypropylene (HMF-PP) must be present. Preferably said high meltflow polypropylene (HMF-PP) is a heterophasic propylene copolymer (H-PP2). Accordingly in the following the heterophasic propylene copolymer (H-PP2) is defined in more detail.

Concerning the melt flow rate $MFR_2$ (230° C.) of the heterophasic propylene copolymer (H-PP2) it is referred to the information provided for the high meltflow polypropylene (HMF-PP).

Further, the heterophasic propylene copolymer (H-PP2) according to this invention comprises
(a) a polypropylene matrix (M2) and
(b) an elastomeric copolymer (E2) comprising units derived from
propylene and
ethylene and/or $C_4$ to $C_{12}$ α-olefin.

Preferably the propylene content in the heterophasic propylene copolymer (H-PP2) is 85.0 to 96.0 wt.-%, more preferably 88.0 to 94.0 wt.-%, based on the total heterophasic propylene copolymer (H-PP2), more preferably based on amount of the polymer components of the heterophasic propylene copolymer (H-PP2), yet more preferably based on the amount of the matrix (M2) and the elastomeric copolymer (E2) together. The remaining part constitute the comonomers different from propylene (ethylene and/or $C_4$ to $C_{12}$ α-olefin), preferably constitutes ethylene.

Concerning the definition of a heterophasic polypropylene, see the information provided when discussing the heterophasic propylene copolymer (H-PP1). Accordingly the heterophasic propylene copolymer (H-PP2) comprises as polymer components only the polypropylene matrix (M2) and the elastomeric copolymer (E2). In other words the heterophasic propylene copolymer (H-PP2) may contain further additives but no other polymer in an amount exceeding 5 wt-%, more preferably exceeding 3 wt.-%, like exceeding 1 wt.-%, based on the total heterophasic propylene copolymer (H-PP2), more preferably based on the polymers present in the heterophasic propylene copolymer (H-PP2). One additional polymer which may be present in such low amounts is a polyethylene which is a reaction product obtained by the preparation of the heterophasic propylene copolymer (H—PP2). Accordingly it is in particular appreciated that a heterophasic propylene copolymer (H-PP2) as defined in the instant invention contains only a polypropylene matrix (M2), an elastomeric copolymer (E2) and optionally a polyethylene in amounts as mentioned in this paragraph. Further, throughout the present invention the xylene cold insoluble (XCI) fraction of the heterophasic propylene copolymer (H-PP2) represents the matrix (M2) and optionally the polyethylene whereas the xylene cold soluble (XCS) fraction represents the elastomeric part of the heterophasic propylene copolymer (H-PP2), i.e. the elastomeric copolymer (E2).

Accordingly the matrix (M2) content, i.e. the xylene cold insoluble (XCI) content, in the heterophasic propylene copolymer (H-PP2) is preferably in the range of 80.0 to 93.0 wt.-%, more preferably in the range of 82.0 to 91.0 wt.-%, like 83.0 to 89.0 wt.-%. In case polyethylene is present in the heterophasic propylene copolymer (H-PP2), the values for the matrix (M2) content but not for the xylene cold insoluble (XCI) content may be a bit decreased.

On the other hand the elastomeric copolymer (E2) content, i.e. the xylene cold soluble (XCS) content, in the heterophasic propylene copolymer (H-PP2) is preferably in the range of 7.0 to 20.0 wt.-%, more preferably in the range of 9.0 to 18.0 wt.-%, like 11.0 to 17.0 wt.-%.

Accordingly the elastomeric copolymer (E2) content, i.e. the xylene cold soluble (XCS) content, in the heterophasic propylene copolymer (H-PP2) is rather low compared to the elastomeric copolymer (E2) content, i.e. the xylene cold soluble (XCS) content, in the heterophasic propylene copolymer (H-PP1). Thus it is appreciated that the amount of xylene cold soluble (XCS) content of the heterophasic polypropylene (H-PP1) measured according to ISO 6427 is higher, preferably at least 8.0 wt.-% higher, more preferably at least 11.0 wt.-% higher, compared to the xylene cold soluble (XCS) content of the heterophasic polypropylene (H-PP2) measured according to ISO 6427. Accordingly it is appreciated that following formula (I), preferably (Ia), is fulfilled $$XCS(H\text{-}PP1) \geq 1.5 \times XCS(H\text{-}PP2) \quad (I)$$

$$XCS(H\text{-}PP1) \geq 1.7 \times XCS(H\text{-}PP2) \quad (Ia)$$

wherein
XCS(H-PP1) is the xylene soluble content measured according to ISO 6427 given in weight percentage of the heterophasic polypropylene (H-PP1), and
XCS(H-PP2) is the xylene soluble content measured according to ISO 6427 given in weight percentage of the heterophasic polypropylene (H-PP2).

Further, the polypropylene matrix (M2) is preferably a random propylene copolymer (R2) or a propylene homopolymer (H2), the latter especially preferred.

Accordingly the comonomer content of the polypropylene matrix (M2) is equal or below 1.0 wt.-%, yet more preferably not more than 0.8 wt.-%, still more preferably not more than 0.5 wt.-%, like not more than 0.2 wt.-%.

As mentioned above the polypropylene matrix (M2) is preferably a propylene homopolymer (H2).

In case the polypropylene matrix (M2) is a random propylene copolymer (R2) it is appreciated that the random propylene copolymer (R2) comprises monomers copolymerizable with propylene, for example comonomers such as ethylene and/or $C_4$ to $C_{12}$ α-olefins, in particular ethylene and/or $C_4$ to $C_8$ α-olefins, e.g. 1-butene and/or 1-hexene. Preferably the random propylene copolymer (R2) according to this invention comprises, especially consists of, monomers copolymerizable with propylene from the group consisting of ethylene, 1-butene and 1-hexene. More specifically the random propylene copolymer (R2) of this invention comprises—apart from propylene—units derivable from ethylene and/or 1-butene. In a preferred embodiment the random propylene copolymer (R2) comprises units derivable from ethylene and propylene only.

Additionally it is appreciated that the random propylene copolymer (R2) has preferably a comonomer content in the range of more than 0.3 to 1.0 wt.-%, more preferably in the range of more than 0.3 to 0.8 wt.-%, yet more preferably in the range of 0.3 to 0.7 wt.-%.

The polypropylene matrix (M2) of the heterophasic propylene copolymer (H-PP2), preferably the polypropylene matrix (M2) being the propylene homopolymer (H2), can be multimodal or bimodal in view of the molecular weight.

Further and preferably the polypropylene matrix (M2) has a rather high melt flow rate. As mentioned above when talking about the melt flow rate of the matrix of a heterophasic polypropylene the melt flow rate of the xylene cold insoluble (XCI) fraction of said heterophasic polypropylene is meant. Accordingly the melt flow rate $MFR_2$ (230° C.) measured according to ISO 1133 of the xylene cold insoluble (XCI) fraction of the heterophasic polypropylene (H-PP1) is preferably lower, more preferably at least 80 g/10 min lower, yet more preferably at least 100 g/10 min lower, compared to the melt flow rate $MFR_2$ (230° C.) measured according to ISO 1133 of the xylene cold insoluble (XCI) fraction of the heterophasic polypropylene (H-PP2).

Accordingly, it is preferred that in the present invention the polypropylene matrix (M2), i.e. the xylene cold insoluble (XCI) fraction of the heterophasic propylene copolymer (H-PP2), has an $MFR_2$ (230° C.) in a range of 100.0 to 1500.0 g/10 min, more preferably of 120.0 to 800.0 g/10 min, still more preferably of 150.0 to 500.0 g/10 min.

Preferably the polypropylene matrix (M2) is isotactic. Accordingly it is appreciated that the polypropylene matrix (M2) has a rather high pentad concentration, i.e. higher than 80%, more preferably higher than 85%, yet more preferably higher than 90%, still more preferably higher than 92%, still yet more preferably higher than 93%, like higher than 95%.

The second component of the heterophasic propylene copolymer (H-PP2) is the elastomeric copolymer (E2).

The elastomeric copolymer (E2) comprises, preferably consists of, units derivable from (i) propylene and (ii) ethylene and/or at least another $C_4$ to $C_{12}$ α-olefin, like $C_4$ to $C_{10}$ α-olefin, more preferably units derivable from (i) propylene and (ii) ethylene and at least another α-olefin selected form the group consisting of 1-butene, 1-pentene, 1-hexene, 1-heptene and 1-octene. The elastomeric copolymer (E2) may additionally contain units derived from a conjugated diene, like butadiene, or a non-conjugated diene, however it is preferred that the elastomeric copolymer consists of units derivable from (i) propylene and (ii) ethylene and/or $C_4$ to $C_{12}$ α-olefins only. Suitable non-conjugated dienes, if used, include straight-chain and branched-chain acyclic dienes, such as 1,4-hexadiene, 1,5-hexadiene, 1,6-octadiene, 5-methyl-1,4-hexadiene, 3,7-dimethyl-1,6-octadiene, 3,7-dimethyl-1,7-octadiene, and the mixed isomers of dihydromyrcene and dihydro-ocimene, and single ring alicyclic dienes such as 1,4-cyclohexadiene, 1,5-cyclooctadiene, 1,5-cyclododecadiene, 4-vinyl cyclohexene, 1-allyl-4-isopropylidene cyclohexane, 3-allyl cyclopentene, 4-cyclohexene and 1-isopropenyl-4-(4-butenyl)cyclohexane. Multi-ring alicyclic fused and bridged ring dienes are also suitable including tetrahydroindene, methyltetrahydroindene, dicyclopentadiene, bicyclo(2,2,1)hepta-2,5-diene, 2-methyl bicycloheptadiene, and alkenyl, alkylidene, cycloalkenyl and cycloalkylidene norbornenes, such as 5-methylene-2-norbornene, 5-isopropylidene norbornene, 5-(4-cyclopentenyl)-2-norbornene; and 5-cyclohexylidene-2-norbornene. Preferred non-conjugated dienes are 5-ethylidene-2-norbornene, 1,4-hexadiene and dicyclopentadiene.

Accordingly the elastomeric copolymer (E2) comprises at least units derivable from propylene and ethylene and may comprise other units derivable from a further α-olefin as defined in the previous paragraph. However it is in particular preferred that elastomeric copolymer (E2) comprises units only derivable from propylene and ethylene and optionally a conjugated diene, like butadiene, or a non-conjugated diene as defined in the previous paragraph, like 1,4-hexadiene. Thus an ethylene propylene non-conjugated diene monomer polymer (EPDM2) and/or an ethylene propylene rubber (EPR2) as elastomeric copolymer (E2) is especially preferred, the latter most preferred.

Like the polypropylene matrix (M2) the elastomeric copolymer (E2) can be unimodal or multimodal, like bimodal. Concerning the definition of unimodal and multimodal, like bimodal, it is referred to the definition above.

In the present invention the content of units derivable from propylene in the elastomeric copolymer (E2) equates with the content of propylene detectable in the xylene cold soluble (XCS) fraction. Accordingly the propylene detectable in the xylene cold soluble (XCS) fraction ranges from 50.0 to 75.0 wt.-%, more preferably 55.0 to 70.0 wt.-%. Thus in a specific embodiment the elastomeric copolymer (E2), i.e. the xylene cold soluble (XCS) fraction, comprises from 25.0 to 50.0 wt.-%, more preferably 30.0 to 45.0 wt.-%, units derivable from ethylene and/or $C_4$ to $C_{12}$. Preferably the elastomeric copolymer (E2) is an ethylene propylene non-conjugated diene monomer polymer (EPDM2) or an ethylene propylene rubber (EPR2), the latter especially preferred, with a propylene and/or ethylene content as defined in this paragraph.

To achieve a good balance between stiffness and ductility the intrinsic viscosity of the xylene cold soluble (XCS) fraction of the two heterophasic polypropylenes shall preferably differ. Thus it is appreciated that the intrinsic viscosity (IV) measured according to ISO 1268-1 (decalin) of the xylene cold soluble (XCS) fraction of the heterophasic propylene copolymer (H-PP1) is higher compared to the intrinsic viscosity (IV) measured according to ISO 1268-1 (decalin) of the xylene cold soluble (XCS) fraction of the heterophasic propylene copolymer (H-PP2).

Accordingly it is preferred that the intrinsic viscosity (IV) of the xylene cold soluble (XCS) fraction of the heterophasic propylene copolymer (H-PP2) is rather low. Rather high values of intrinsic viscosity improve the ductility of the heterophasic system. Accordingly it is appreciated that the intrinsic viscosity of the xylene cold soluble (XCS) fraction of the heterophasic propylene copolymer (H-PP2) is below 2.8 dl/g, more preferably below 2.5 dl/g, yet more preferably below 2.0 dl/g. Even more preferred the intrinsic viscosity of the xylene cold soluble (XCS) fraction of the heterophasic propylene copolymer (H-PP2) is in the range of 1.7 to 3.0 dl/g, more preferably in the range 1.8 to 2.7 dl/g. The intrinsic viscosity is measured according to ISO 1628 in decaline at 135° C.

A further essential requirement of the present invention is the presence of a styrenic block copolymer (SBC). Preferably the styrenic block copolymer (SBC) can be a styrene-ethylene/butylene-styrene (SEBS) block copolymer and/or a hydrogenated styrene-vinyl isoprene (SIS) block rubber. It is especially preferred that the styrenic block copolymer (SBC) is a styrene-ethylene/butylene-styrene (SEBS) block copolymer.

Accordingly it is appreciated that the styrenic block copolymer (SBC), preferably the styrene-ethylene/butylene-styrene (SEBS) block copolymer and/or the hydrogenated styrene-vinyl isoprene (SIS) block rubber, has (have) a styrene content of equal or below 25 wt.-%, more preferably of equal or below 20 wt.-%, yet more preferably of equal or below 18 wt.-%. On the other hand the styrene content in the styrenic block copolymer (SBC), preferably the styrene-ethylene/butylene-styrene (SEBS) block copolymer and/or the hydrogenated styrene-vinyl isoprene (SIS) block rubber, shall not fall below 10 wt.-%. Thus a preferred range is of 10 to 25 wt.-%, more preferred of 11 to 20 wt.-% and yet more preferred of 12 to 18 wt.-%.

Further it is appreciated that the styrenic block copolymer (SBC), preferably the styrene-ethylene/butylene-styrene (SEBS) block copolymer and/or the hydrogenated styrene-vinyl isoprene (SIS) block rubber, has (have) a melt flow rate MFR (230° C./5.0 kg) of at least 8.0 g/10 min, more preferably of at least 15.0 g/10 min, still more preferably of at least 20.0 g/10 min. On the other hand the melt flow rate MFR (230° C./5.0 kg) of the styrenic block copolymer (SBC), preferably the styrene-ethylene/butylene-styrene (SEBS) block copolymer and/or the hydrogenated styrene-vinyl isoprene (SIS) block rubber, shall not more than 30.0 g/10 min. Accordingly, a preferred melt flow rate MFR (230° C./5.0 kg) is in the range of 8.0 to 30.0 g/10 min, more preferred of 15.0 to 28.0 g/10 min, still more preferred of 18.0 to 25.0 g/10 min.

Further the styrenic block copolymer (SBC), preferably the styrene-ethylene/butylene-styrene (SEBS) block copolymer and/or the hydrogenated styrene-vinyl isoprene (SIS) block rubber, may be defined by its density. Thus it is appreciated that the styrenic block copolymer (SBC), preferably the styrene-ethylene/butylene-styrene (SEBS) block copolymer and/or the hydrogenated styrene-vinyl isoprene (SIS) block rubber, has (have) a density of equal or below 0.910 g/cm$^3$, more preferred equal or below 0.900 g/cm$^3$.

Optionally as a further polymer component in the instant composition is a high density polyethylene (HDPE).

By high density polyethylene (HDPE) according to this invention is meant a polyethylene with a density measured according to ISO 1183-187 of at least 940 kg/m$^3$, more preferably of at least 955 kg/m$^3$, yet more preferably in the range of 940 to 975 kg/m$^3$, still yet more preferably in the range of 958 to 968 kg/m$^3$, like 960 to 966 kg/m$^3$.

Preferably the high density polyethylene (HDPE) has a melt flow rate MFR$_2$ (190° C.) of 6.0 to 15 g/10 min, more preferably of 7.0 to 10.0 g/10 min, like 7.5 to 9.0 g/10 min.

Finally the instant composition must comprise a mineral filler (F), preferably an anisotropic mineral filler (F). Accordingly the mineral filler is preferably selected from the group consisting of talc, mica and wollastonite. Most preferably the mineral filler (F) is talc.

Especially good results are achievable in case the mineral filler (F) has a particle size distribution d95 in the range of 1 to 20 μm, more preferably in the range of 5 to 15 μm. Typically the mineral filler (F) has a surface area measured according to the commonly known BET method with $N_2$ gas as analysis adsorptive of more than 5 m$^2$/g, more preferably of more than 10 m$^2$/g, yet more preferably of more than 12 m$^2$/g, still yet more preferably in the range of 5 to 25 m$^2$/g, like 10 to 20 m$^2$/g.

The instant composition may additional contain other additives than the mineral filler (F). For instance it is appreciated that the composition comprises acid scavengers (AS), antioxidants (AO), nucleating agents (NA), hindered amine light stabilizers (HALS), slip agents (SA), and pigments. Preferably the amount of additives excluding the mineral filler (F) shall not exceed 7 wt.-%, more preferably shall not exceed 5 wt.-%, like not more than 3.5 wt.-%, within the instant composition.

In the following preferred additives are listed.

A preferred acid scavenger (AS) is Ca-stearate.

As antioxidants (AO) preferably phenolic antioxidant and/or phosphorous antioxidant shall be present in the inventive composition.

More preferably the phenolic antioxidant is selected from the group consisting of pentaerythrityl-tetrakis(3-(3,5-di-tert-butyl-4-hydroxyphenyl)propionate (CAS no. 6683-19-8; 1178 g/mol), octadecyl 3-(3',5'-di-tert-butyl-4-hydroxyphenyl)propionate (CAS no. 2082-79-3; 531 g/mol)

bis(3,3-bis(3'-tert-butyl-4'-hydroxyphenyl)butanic acid)glycolester (CAS no. 32509-66-3; 794 g/mol), 3,3'-Bis(3,5-di-tert-butyl-4-hydroxyphenyl)-N,N'-hexamethylenedipropionamide (CAS no. 23128-74-7; 637 g/mol), 3,9-bis(1,1-dimethyl-2-(beta-(3-tert-butyl-4-hydroxy-5-methylphenyl)propionyloxy)ethyl)-2,4,8,10-tetraoxaspiro[5.5]undecane (CAS no. 90498-90-1; 741 g/mol), 1,6-hexanediyl-bis(3,5-bis(1,1-dimethylethyl)-4-hydroxybenzene)propanoate) (CAS no. 35074-77-2; 639 g/mol), triethylenglycol-bis-(3-tert-butyl-4-hydroxy-5-methylphenyl)propionate (CAS no. 36443-68-2; 587 g/mol), a mixture of C13 to C15 linear and branched alkyl esters of 3-(3',5'-di-t-butyl-4'-hydroxyphenyl)propionic acid (CAS no. 171090-93-0; 485 g/mol), and benzenepropanoic acid, 3,5-bis(1,1-dimethyl-ethyl)-4-hydroxy-,C7-C9-branched and linear alkyl esters (CAS no. 125643-61-0; 399 g/mol), The most preferred phenolic antioxidant is pentaerythrityl-tetrakis(3-(3,5-di-tert-butyl-4-hydroxyphenyl)propionate (CAS no. 6683-19-8; 1178 g/mol).

The preferred phosphorous antioxidant is selected from the group consisting of tris-(2,4-di-tert-butylphenyl)phosphite (CAS no. 31570-04-4; 647 g/mol), tetrakis-(2,4-di-tert-butylphenyl)-4,4'-biphenylen-di-phosphonite (CAS no. 38613-77-3; 991 g/mol), bis-(2,4-di-tert-butylphenyl)-pentaerythrityl-di-phosphite (CAS no. 26741-53-7; 604 g/mol), di-stearyl-pentaerythrityl-di-phosphite (CAS no. 3806-34-6; $M_w$ 733 g/mol), tris-nonylphenyl phosphite (CAS no. 26523-78-4; 689 g/mol), bis(2,6-di-tert-butyl-4-methylphenyl)pentaerythrityl-di-phosphite (CAS no. 80693-00-1; 633 g/mol), 2,2'-methylenebis(4,6-di-tert-butylphenyl)octyl-phosphite (CAS no. 126050-54-2; 583 g/mol), 1,1,3-tris(2-methyl-4-ditridecyl phosphite-5-tert-butylphenyl)butane (CAS no. 68958-97-4; 1831 g/mol), 4,4'-butylidenebis(3-methyl-6-tert-butylphenyl-di-tridecyl) phosphite (CAS no. 13003-12-8; 1240 g/mol), bis-(2,4-dicumylphenyl)pentaerythritol diposphite (CAS no. 154862-43-8; 852 g/mol), bis(2-methyl-4,6-bis(1,1-dimethylethyl)phenyl)phosphorous acid ethylester (CAS no. 145650-60-8; 514 g/mol), 2,2',2"-nitrilo triethyl-tris(3,3',5,5'-tetra-tert-butyl-1,1'-biphenyl-2,2'-diyl)phosphite) (CAS no. 80410-33-9; 1465 g/mol)

2,4,6-Tris(tert-butyl)phenyl-2-butyl-2-ethyl-1,3-propandiol-phosphit (CAS no. 161717-32-4, 450 g/mol), 2,2'-Ethyliden-bis(4,6-di-tert-butylphenyl)fluorphosphonit (CAS no. 118337-09-0; 487 g/mol), 6-(3-(3-tert-butyl-4-hydroxy-5-methylphenyl)propoxy)-2,4,8,10-tetra-tert-butyldibenz[d,f][1.3.2]dioxaphosphepin (CAS no. 203255-81-6; 660 g/mol), tetrakis-(2,4-di-tert-butyl-5-methylphenyl)-4,4'-biphenylen-di-phosphite (CAS no. 147192-62-9; 1092 g/mol), and 1,3-bis-(diphenylphosphino)-2,2-dimethylpropane (CAS no. 80326-98-3; 440.5 g/mol).

The most preferred phosphorous antioxidant is tris-(2,4-di-tert-butylphenyl)phosphite (CAS no. 31570-04-4; 647 g/mol).

Hindered amine light stabilizers (HALS) are known in the art. Preferably such hindered amine light stabilizers are 2,6-alkyl-piperidine derivatives in particular 2,2,6,6-tetramethyl-piperidine derivatives.

Accordingly the hindered amine light stabilizer is preferably selected from the group consisting of bis-(2,2,6,6-tetramethyl-4-piperidyl)sebacate (CAS no. 52829-07-9; 481 g/mol), bis-(1,2,2,6,6-pentamethyl-4-piperidyl)sebacate (CAS no. 41556-26-7; 509 g/mol), tetrakis(2,2,6,6-tetramethyl-4-piperidyl)-1,2,3,4-butane tetracarboxylate (CAS no. 64022-61-3; 792 g/mol), tetrakis(1,2,2,6,6-pentamethyl-4-piperidyl)-1,2,3,4-butane tetracarboxylate (CAS no. 91788-83-9; 847 g/mol), 1,2,3-tris(1,2,2,6,6-pentamethyl-4-piperidyl)-4-tridecyl butane-1,2,3,4-tetracarboxylate (CAS no. 84696-72-0; 900 g/mol), 1,2,3-tris(2,2,6,6-tetramethyl-4-piperidyl)-4-tridecyl butane-1,2,3,4-tetracarboxylate (CAS no. 84696-71-9; 900 g/mol), N,N'-bisformyl-N,N'-bis-(2,2,6,6-tetramethyl-4-piperidinyl)-hexamethylendiamine (CAS no. 124172-53-8; 450 g/mol), 1,3,5-triazine-2,4,6-triamine, $N_5N'''$-1,2-ethanediylbis[N-[3-[[4,6-bis[butyl(1,2,2,6,6-pentamethyl-4-piperidinyl)amino]-1,3,5-triazin-2-yl]amino]propyl]-N',N"-dibutyl-N',N"-bis(1,2,2,6,6-pentamethyl-4-piperidinyl)- (CAS no. 106990-43-6; 2286 g/mol), and bis-(1-octyloxy-2,2,6,6-tetramethyl-4-piperidinyl)sebacate (CAS no. 129757-67-1; 737 g/mol).

In case a nucleating agent (NA) is used it is preferably an α-nucleating agent. Even more preferred the present invention is free of β-nucleating agents. According to the present invention the nucleating agent (NA) is understood as a nucleating agent different to the mineral filler (F). Accordingly the nucleating agent (NA) is preferably selected from the group consisting of (i) salts of monocarboxylic acids and polycarboxylic acids, e.g. sodium benzoate or aluminum tert-butylbenzoate, and (ii) dibenzylidenesorbitol (e.g. 1,3:2,4 dibenzylidenesorbitol) and $C_1$-$C_8$-alkyl-substituted dibenzylidenesorbitol derivatives, such as methyldibenzylidenesorbitol, ethyldibenzylidenesorbitol or dimethyldibenzylidenesorbitol (e.g. 1,3:2,4 di(methylbenzylidene)sorbitol), nonito-1,1,2,3,-trideoxy-4,6:5,7-bis-O-[(4-propylphenyl)methylene]-nonitol, and (iii) salts of diesters of phosphoric acid, e.g. sodium 2,2'-methylenebis(4,6,-di-tert-butylphenyl)phosphate or aluminium-hydroxy-bis[2,2'-methylene-bis(4,6-di-t-butylphenyl)phosphate], and (iv) vinylcycloalkane polymer and vinylalkane polymer.

It is especially preferred that the nucleating agent (NA) is sodium 2,2'-methylene bis(4,6,-di-tert-butylphenyl)phosphate.

A preferred slip agent is for instance a fatty acid amide. Preferably the amount of carbon atoms of the fatty acid is preferably in the range of $C_{10}$ to $C_{25}$ carbon atoms.

Accordingly the slip agent (SA) is preferably selected from the group consisting of
cis-13-docosenoic amide (CAS no. 112-84-5; 337.6 g/mol),
cis-9,10 octadecenoamide (CAS no. 301-02-0; 281.5 g/mol)
octadecanoylamide (CAS no. 124-26-5; 283.5 g/mol),
behenamide (CAS no. 3061-75-4; 339.5 g/mol),
N,N'-ethylene-bis-stearamide (CAS no. 110-30-5; 588 g/mol),
N-octadecyl-13-docosenamide (CAS no. 10094-45-8; 590 g/mol), and
oleylpalmitamide (CAS no. 16260-09-6; 503 g/mol).

Especially suitable is cis-13-docosenoic amide (CAS no. 112-84-5; 337.6 g/mol) and/or cis-9-octadecenamide (CAS no. 301-02-0; 281.5 g/mol).

All components used for the preparation of the instant composition are known. Accordingly also their preparation is well known. For instance the heterophasic polypropylenes according to this invention are preferably produced in a multistage process known in the art, wherein the matrix is produced at least in one slurry reactor and subsequently the elastomeric copolymer is produced at least in one gas phase reactor.

Thus, the polymerization system can comprise one or more conventional stirred slurry reactors and/or one or more gas phase reactors. Preferably the reactors used are selected from the group of loop and gas phase reactors and, in particular, the process employs at least one loop reactor and at least one gas phase reactor. It is also possible to use several reactors of each type, e.g. one loop and two or three gas phase reactors, or two loops and one or two gas phase reactors, in series.

Preferably the process comprises also a prepolymerisation with the chosen catalyst system, as described in detail below, comprising the Ziegler-Natta procatalyst, the external donor and the cocatalyst.

In a preferred embodiment, the prepolymerisation is conducted as bulk slurry polymerization in liquid propylene, i.e. the liquid phase mainly comprises propylene, with minor amount of other reactants and optionally inert components dissolved therein.

The prepolymerisation reaction is typically conducted at a temperature of 0 to 50° C., preferably from 10 to 45° C., and more preferably from 15 to 40° C.

The pressure in the prepolymerisation reactor is not critical but must be sufficiently high to maintain the reaction mixture in liquid phase. Thus, the pressure may be from 20 to 100 bar, for example 30 to 70 bar.

The catalyst components are preferably all introduced to the prepolymerisation step. However, where the solid catalyst component (i) and the cocatalyst (ii) can be fed separately it is possible that only a part of the cocatalyst is introduced into the prepolymerisation stage and the remaining part into subsequent polymerisation stages. Also in such cases it is necessary to introduce so much cocatalyst into the prepolymerisation stage that a sufficient polymerisation reaction is obtained therein.

It is possible to add other components also to the prepolymerisation stage. Thus, hydrogen may be added into the prepolymerisation stage to control the molecular weight of the prepolymer as is known in the art. Further, antistatic additive may be used to prevent the particles from adhering to each other or to the walls of the reactor.

The precise control of the prepolymerisation conditions and reaction parameters is within the skill of the art.

A slurry reactor designates any reactor, such as a continuous or simple batch stirred tank reactor or loop reactor, operating in bulk or slurry and in which the polymer forms in particulate form. "Bulk" means a polymerization in reaction medium that comprises at least 60 wt.-% monomer. According to a preferred embodiment the slurry reactor comprises a bulk loop reactor.

"Gas phase reactor" means any mechanically mixed or fluid bed reactor. Preferably the gas phase reactor comprises a mechanically agitated fluid bed reactor with gas velocities of at least 0.2 m/sec.

The particularly preferred embodiment for the preparation of the heterophasic polypropylenes of the invention comprises carrying out the polymerization in a process comprising either a combination of one loop and one or two gas phase reactors or a combination of two loops and one or two gas phase reactors.

A preferred multistage process is a slurry-gas phase process, such as developed by Borealis and known as the Borstar® technology. In this respect, reference is made to EP 0 887 379 A1, WO 92/12182, WO 2004/000899, WO 2004/111095, WO 99/24478, WO 99/24479 and WO 00/68315. They are incorporated herein by reference.

A further suitable slurry-gas phase process is the Spheripol® process of Basell.

Preferably the heterophasic polypropylene composition according to this invention are produced by using a special Ziegler-Natta procatalyst in combination with a special external donor, as described below in detail, preferably in the Spheripol® or in the Borstar®-PP process.

One preferred multistage process may therefore comprise the steps of:
producing a polypropylene matrix in the presence of the chosen catalyst system, as for instance described in detail below, comprising the special Ziegler-Natta procatalyst (i), an external donor (iii) and the cocatalyst (ii) in a first slurry reactor and optionally in a second slurry reactor, both slurry reactors using the same polymerization conditions,
transferring the slurry reactor product into at least one first gas phase reactor, like one gas phase reactor or a first and a second gas phase reactor connected in series,
producing an elastomeric copolymer in the presence of the polypropylene matrix and in the presence of the catalyst system in said at least first gas phase reactor,
recovering the polymer product for further processing.

With respect to the above-mentioned preferred slurry-gas phase process, the following general information can be provided with respect to the process conditions.

Temperature is preferably from 40 to 110° C., preferably between 50 and 100° C., in particular between 60 and 90° C., with a pressure in the range of from 20 to 80 bar, preferably 30 to 60 bar, with the option of adding hydrogen in order to control the molecular weight in a manner known per se.

The reaction product of the slurry polymerization, which preferably is carried out in a loop reactor, is then transferred to the subsequent gas phase reactor(s), wherein the temperature preferably is within the range of from 50 to 130° C., more preferably 60 to 100° C., at a pressure in the range of from 5 to 50 bar, preferably 8 to 35 bar, again with the option of adding hydrogen in order to control the molecular weight in a manner known per se.

The average residence time can vary in the reactor zones identified above. In one embodiment, the average residence time in the slurry reactor, for example a loop reactor, is in the range of from 0.5 to 5 hours, for example 0.5 to 2 hours, while the average residence time in the gas phase reactor generally will be from 1 to 8 hours.

If desired, the polymerization may be effected in a known manner under supercritical conditions in the slurry, preferably loop reactor, and/or as a condensed mode in the gas phase reactor.

According to the invention the heterophasic polypropylenes are preferably obtained by a multistage polymerization process, as described above, in the presence of a catalyst system comprising as component (i) a Ziegler-Natta procatalyst which contains a trans-esterification product of a lower alcohol and a phthalic ester.

The procatalyst used according to the invention is prepared by
a) reacting a spray crystallized or emulsion solidified adduct of $MgCl_2$ and a $C_1$-$C_2$ alcohol with $TiCl_4$
b) reacting the product of stage a) with a dialkylphthalate of formula (I)

(I)

wherein $R^{1'}$ and $R^{2'}$ are independently at least a $C_5$ alkyl under conditions where a transesterification between said $C_1$ to $C_2$ alcohol and said dialkylphthalate of formula (I) takes place to form the internal donor
c) washing the product of stage b) or
d) optionally reacting the product of step c) with additional $TiCl_4$.

The procatalyst is produced as defined for example in the patent applications WO 87/07620, WO 92/19653, WO 92/19658 and EP 0 491 566. The content of these documents is herein included by reference.

First an adduct of $MgCl_2$ and a $C_1$-$C_2$ alcohol of the formula $MgCl_2*nROH$, wherein R is methyl or ethyl and n is 1 to 6, is formed. Ethanol is preferably used as alcohol.

The adduct, which is first melted and then spray crystallized or emulsion solidified, is used as catalyst carrier.

In the next step the spray crystallized or emulsion solidified adduct of the formula $MgCl_2*nROH$, wherein R is methyl or ethyl, preferably ethyl and n is 1 to 6, is contacting with $TiCl_4$ to form a titanised carrier, followed by the steps of
adding to said titanised carrier
(i) a dialkylphthalate of formula (I) with $R^{1'}$ and $R^{2'}$ being independently at least a $C_5$-alkyl, like at least a $C_8$-alkyl, or preferably
(ii) a dialkylphthalate of formula (I) with $R^{1'}$ and $R^{2'}$ being the same and being at least a $C_5$-alkyl, like at least a $C_8$-alkyl,
or more preferably
(iii) a dialkylphthalate of formula (I) selected from the group consisting of propylhexylphthalate (PrHP), dioctylphthalate (DOP), di-iso-decylphthalate (DIDP), and ditridecylphthalate (DTDP), yet more preferably the dialkylphthalate of formula (I) is a dioctylphthalate (DOP), like di-iso-octylphthalate or diethylhexylphthalate, in particular diethylhexylphthalate, to form a first product,
subjecting said first product to suitable transesterification conditions, i.e. to a temperature above 100° C., preferably between 100 to 150° C., more preferably between 130 to 150° C., such that said methanol or ethanol is transesterified with said ester groups of said dialkylphthalate of formula (I) to form preferably at least 80 mol-%, more preferably 90 mol-%, most preferably 95 mol.-%, of a dialkylphthalate of formula (II)

(II)

with $R^1$ and $R^2$ being methyl or ethyl, preferably ethyl, the dialkylphthalat of formula (II) being the internal donor and
recovering said transesterification product as the procatalyst composition (component (i)).

The adduct of the formula $MgCl_2*nROH$, wherein R is methyl or ethyl and n is 1 to 6, is in a preferred embodiment melted and then the melt is preferably injected by a gas into a cooled solvent or a cooled gas, whereby the adduct is crystallized into a morphologically advantageous form, as for example described in WO 87/07620.

This crystallized adduct is preferably used as the catalyst carrier and reacted to the procatalyst useful in the present invention as described in WO 92/19658 and WO 92/19653.

As the catalyst residue is removed by extracting, an adduct of the titanised carrier and the internal donor is obtained, in which the group deriving from the ester alcohol has changed.

In case sufficient titanium remains on the carrier, it will act as an active element of the procatalyst.

Otherwise the titanization is repeated after the above treatment in order to ensure a sufficient titanium concentration and thus activity.

Preferably the procatalyst used according to the invention contains 2.5 wt.-% of titanium at the most, preferably 2.2% wt.-% at the most and more preferably 2.0 wt.-% at the most. Its donor content is preferably between 4 to 12 wt.-% and more preferably between 6 and 10 wt-%.

More preferably the procatalyst used according to the invention has been produced by using ethanol as the alcohol and dioctylphthalate (DOP) as dialkylphthalate of formula (I), yielding diethyl phthalate (DEP) as the internal donor compound.

Still more preferably the catalyst used according to the invention is the BC-1 catalyst of Borealis (prepared according to WO 92/19653 as disclosed in WO 99/24479; especially with the use of dioctylphthalate as dialkylphthalate of formula (I) according to WO 92/19658) or the catalyst Polytrack 8502, commercially available from Grace.

In a further embodiment, the Ziegler-Natta procatalyst can be modified by polymerising a vinyl compound in the presence of the catalyst system, comprising the special Ziegler-Natta procatalyst, an external donor and a cocatalyst, which vinyl compound has the formula:

wherein R³ and R⁴ together form a 5- or 6-membered saturated, unsaturated or aromatic ring or independently represent an alkyl group comprising 1 to 4 carbon atoms, and the modified catalyst is used for the preparation of the heterophasic polypropylene composition according to this invention. The polymerized vinyl compound can act as an α-nucleating agent. This modification is in particular used for the preparation of the heterophasic polypropylene (H-PP1).

Concerning the modification of catalyst reference is made to the international applications WO 99/24478, WO 99/24479 and particularly WO 00/68315, incorporated herein by reference with respect to the reaction conditions concerning the modification of the catalyst as well as with respect to the polymerization reaction.

For the production of the heterophasic polypropylenes according to the invention the catalyst system used preferably comprises in addition to the special Ziegler-Natta procatalyst an organometallic cocatalyst as component (ii).

Accordingly it is preferred to select the cocatalyst from the group consisting of trialkylaluminium, like triethylaluminium (TEA), dialkyl aluminium chloride and alkyl aluminium sesquichloride.

Component (iii) of the catalysts system used is an external donor represented by formula (III)

$$Si(OCH_3)_2R_2^5 \qquad (III)$$

wherein R⁵ represents a branched-alkyl group having 3 to 12 carbon atoms, preferably a branched-alkyl group having 3 to 6 carbon atoms, or a cyclo-alkyl having 4 to 12 carbon atoms, preferably a cyclo-alkyl having 5 to 8 carbon atoms.

It is in particular preferred that R⁵ is selected from the group consisting of iso-propyl, iso-butyl, iso-pentyl, tert.-butyl, tert.-amyl, neopentyl, cyclopentyl, cyclohexyl, methylcyclopentyl and cycloheptyl.

More preferably the external donor is either dicyclopentyl dimethoxy silane [Si(OCH₃)₂(cyclo-pentyl)₂] or diisopropyl dimethoxy silane [Si(OCH₃)₂(CH(CH₃)₂)₂].

For mixing the individual components of the instant composition, a conventional compounding or blending apparatus, e.g. a Banbury mixer, a 2-roll rubber mill, Buss-co-kneader or a twin screw extruder may be used. The polymer materials recovered from the extruder are usually in the form of pellets. These pellets are then preferably further processed, e.g. by injection moulding to generate articles and products of the inventive composition.

Accordingly the present invention is also directed to a process for the preparation of the instant composition comprising the steps of adding the heterophasic polypropylene (H-PP1), the high melt flow polypropylene (HMF-PP), the styrenic block copolymer (SBC), the mineral filler (F), and optionally other additives to an extruder (as mentioned above) and extruding the same obtaining thereby said composition.

The composition according to the invention may be pelletized and compounded using any of the variety of compounding and blending methods well known and commonly used in the resin compounding art.

The composition of the present invention is preferably used for the production of automotive articles, like moulded automotive articles, preferably automotive injection moulded articles. Even more preferred is the use for the production of car interiors and exteriors, like bumpers, side trims, step assists, body panels, spoilers, dashboards, interior trims and the like.

The current invention also provides (automotive) articles, like injection molded articles, comprising at least to 60 wt.-%, more preferably at least 80 wt.-%, yet more preferably at least 95 wt.-%, like consisting, of the inventive polypropylene composition. Accordingly the present invention is especially directed to automotive articles, especially to car interiors and exteriors, like bumpers, side trims, step assists, body panels, spoilers, dashboards, interior trims and the like, comprising at least to 60 wt.-%, more preferably at least 80 wt.-%, yet more preferably at least 95 wt.-%, like consisting, of the inventive polypropylene composition.

The present invention will now be described in further detail by the examples provided below.

EXAMPLES

1. Definitions/Measuring Methods

The following definitions of terms and determination methods apply for the above general description of the invention as well as to the below examples unless otherwise defined.

Quantification of Isotacticity in Polypropylene by $^{13}C$ NMR Spectroscopy

The isotacticity is determined by quantitative $^{13}C$ nuclear magnetic resonance (NMR) spectroscopy after basic assignment as e.g. in: V. Busico and R. Cipullo, Progress in Polymer Science, 2001, 26, 443-533. Experimental parameters are adjusted to ensure measurement of quantitative spectra for this specific task as e.g in: S. Berger and S. Braun, 200 and More NMR Experiments: A Practical Course, 2004, Wiley-VCH, Weinheim. Quantities are calculated using simple corrected ratios of the signal integrals of representative sites in a manner known in the art. The isotacticity is determined at the pentad level i.e. mmmm fraction of the pentad distribution.

Density is measured according to ISO 1183-187. Sample preparation is done by compression moulding in accordance with ISO 1872-2:2007.

MFR₂ (230° C.) is measured according to ISO 1133 (230° C., 2.16 kg load).

MFR (230° C./5 kg) is measured according to ISO 1133 (230° C., 5 kg load).

MFR₂ (190° C.) is measured according to ISO 1133 (190° C., 2.16 kg load).

Quantification of Comonomer Content by FTIR Spectroscopy

The comonomer content is determined by quantitative Fourier transform infrared spectroscopy (FTIR) after basic assignment calibrated via quantitative $^{13}C$ nuclear magnetic resonance (NMR) spectroscopy in a manner well known in the art. Thin films are pressed to a thickness of between 100-500 μm and spectra recorded in transmission mode. Specifically, the ethylene content of a polypropylene-co-ethylene copolymer is determined using the baseline corrected peak area of the quantitative bands found at 720-722 and 730-733 cm⁻¹. Quantitative results are obtained based upon reference to the film thickness.

Intrinsic viscosity is measured according to DIN ISO 1628/1, October 1999 (in Decalin at 135° C.).

Tensile Modulus; Elongation at break; Yield Stress are measured according to ISO 527-2 (cross head speed=50 mm/min; 23° C.) using injection molded specimens as described in EN ISO 1873-2 (dog bone shape, 4 mm thickness).

Flexural Modulus: The flexural modulus was determined in 3-point-bending according to ISO 178 on injection molded specimens of 80×10×4 mm prepared in accordance with ISO 294-1:1996.

Izod notched impact strength is determined according to ISO 180/1A at 23° C., and at −30° C. by using injection moulded test specimens as described in EN ISO 1873-2 (80× 10×4 mm)

The xylene cold solubles (XCS, wt.-%): Content of Xylene solubles (XCS) is determined at 23° C. according ISO 6427.

Styrene Content

The styrene content is measured by Fourier transform infrared spectroscopy (FTIR). A thin film of 300 µm thickness is prepared from pelletized material by hot-pressing (190° C., 100 bar, 1 minute). Per sample, two films are prepared. The so prepared film-samples are measured by a Perkin Elmer IR-Spectrophotometer System 2000FTIR. The peak at 1602 $cm^{-1}$ (Phenyl-Absorption) is integrated and evaluated by using an internally established calibration curve. The arithmetic mean of two measurements is given as result.

Calibration: Various polypropylene-compounds consisting of PP and a styrene-containing elastomer (of known styrene-content) are prepared and measured according to the method described above.

Particle size d95 is calculated from the particle size distribution as determined by laser diffraction according to ISO 13320-1:1999.

Surface area is determined as the BET surface according to ISO 787-11 with nitrogen ($N_2$).

Scratch Resistance

To determine the scratch resistance a Cross Hatch Cutter Model 42Op, manufactured by Erichsen, was used.

For the tests, plaques of 70×70×4 mm size were cut from a moulded grained (grain parameters: average grain size=1 mm, grain depth=0.12 mm, conicity=6°) plaque of size 140× 200×4 mm. The minimum period between injection moulding of specimens and scratch-testing was 7 days For testing the specimens must be clamped in a suitable apparatus as described above. Scratches are applied at a force of 10 N using a cylindrical metal pen with a ball shaped end (radius=0.5 mm+−0.01). A cutting speed of 1000 mm/min is used.

A minimum of 20 scratches parallel to each other are brought up at a load of 10 N with a distance of 2 mm. The application of the scratches is repeated perpendicular to each other, so that the result is a scratching screen. The scratching direction shall be unidirectional.

The scratch resistance is reported as the difference of the luminance ΔL of the unscratched from the scratched areas. ΔL values can be measured using a spectrophotometer that fulfils the requirements to DIN 5033.

Measured ΔL Values must be below a maximum of 1.5.

A detailed test description of the test method can be found in the article "Evaluation of scratch resistance in multiphase PP blends" by Thomas Koch and Doris Machl, published in POLYMER TESTING 26 (2007), p. 927-936.

Coefficient of linear thermal expansion: The coefficient of linear thermal expansion (CLTE) was determined in accordance with ISO 11359-2:1999 on 10 mm long pieces cut from the same injection molded specimens as used for the flexural modulus determination. The measurement was performed in a temperature range from −30 to +80° C. at a heating rate of 1° C./min.

Fogging measured according DIN 75201

2. Examples

TABLE 1

The heterophasic polypropylenes (HECO) used

|  |  | HECO 1 | HECO 2 | HECO 3 | HECO 4 |
|---|---|---|---|---|---|
| MFR | [g/10 min] | 22.0 | 20.0 | 11.0 | 100.0 |
| MFR of XCI | [g/10 min] |  |  | 55.0 | 160 |
| XCS | [wt %] |  |  | 30.0 | 15 |
| C2 total | [wt %] |  |  | 12.5 | 8.0 |
| C2 in XCS | [wt %] |  |  | 38 | 39 |
| IV of XCS | [dl/g] |  |  | 2.5 | 1.9 |
| Filler | [wt.-%] | 20 | 20 |  |  |

"HECO 1" is the commercial product EF209AE of Borealis
"HECO 2" is the commercial product EG250AI of Borealis
"HECO 3" is the commercial product EE050AE of Borealis
"HECO 4" (HMF-PP) is the commercial product BJ356MO of Borealis
"Filler" is the commercial talc JETFINE 3CA of Luzenac

TABLE 2

Compositions

| Example* |  | CE 1 | CE 2 | E 1 | E 2 | E 3 |
|---|---|---|---|---|---|---|
| HECO 1 | [wt %] | 100 | — | — | — | — |
| HECO 2 | [wt %] | — | 100 | — | — | — |
| HECO 3 | [wt %] | — | — | 35.68 | 31.68 | 30.68 |
| HECO 4 | [wt %] | — | — | 25.00 | 25.00 | 25.0 |
| SEBS | [wt %] | — | — | 15.00 | 19.00 | 15.00 |
| HDPE | [wt %] | — | — | — | — | 5.00 |
| Talc | [wt %] | — | — | 22.0 | 22.0 | 21.30 |
| ESA | [wt %] | — | — | 0.20 | 0.20 | — |
| Oleamide | [wt %] | — | — | — | — | 0.20 |
| NA | [wt %] | — | — | 0.07 | 0.07 | 0.07 |
| MFR | [g/10 min] | 22.0 | 20.0 | 19.1 | 17.7 | 20.6 |
| Tensile Stress @ yield | [MPa] | 17.0 | 21.0 | 17.4 | 15.7 | 17.0 |
| Flexural Modulus | [MPa] | 1700 | 1800 | 1950 | 1670 | 1700 |
| Izod, notched +23° C. | [kJ/m²] | 50 | 30 | 49.0 | 57.0 | 55.0 |
| Izod, notched −30° C. | [kJ/m²] | 5 | 3 | 8.3 | 20.0 | 8.8 |
| Fogging | [mg] | — | 1.5 | 0.8 | 0.7 | 1.0 |
| Scratch resistance 10N | [ΔL] | >1.5 | <1.5 | <1.5 | <1.5 | <0.5 |

TABLE 2-continued

| | | Compositions | | | | |
|---|---|---|---|---|---|---|
| Example* | | CE 1 | CE 2 | E 1 | E 2 | E 3 |
| CLTE −30° C./80° C. | [10E$^{-06}$ μm/mK] | 45 | 50 | — | — | <43 |

*Rest to 100 wt.-% are additives, like antioxidants
"SEBS" is the commercial styrene ethylene butylene styrene block copolymer product Kraton G 1657 of Kraton Polymers LLC having a styrene content of about 13.0 wt.-% and a melt flow rate MFR (230° C./5 kg) of 22 g/10 min,
"HDPE" is the commercial high density polyethylene product MG 9641 of Borealis AG having a MFR$_2$ (190°) of 8 g/10 min and a density of 964 kg/m$^3$,
"Talc" is the commercial talc HAR T84 of Luzenac,
"Carbon black" is the commercial master batch "Plasblak PE4103" of Cabot,
"AO1" is the commercial phenolic antioxidant Irganox 1010 of Ciba,
"AO2" is the commercial phosphorous antioxidant Irgafos 168 of Ciba,
"NA" is the commercial α-nucleating agent sodium 2,2'-methylenebis (4,6,-di-tert-butylphenyl) phosphate (NA11) of Ciba,
"ESA" is the commercial 13-docosenamide of Croda,
"Oleamide" is the commercial 9-octadecenamide of Croda,
"HALS" is the commercial hindered amine light stabilizer (HALS) Cytec 3808 of Cytec.

We claim:

1. Composition comprising a melt flow rate MFR$_2$ (230° C.) measured according to ISO 1133 in the range of 15 to 30 g/10 min, said composition comprises
   25 to 40 wt.-% of a heterophasic propylene copolymer (H-PP1),
   22 to 30 wt.-% of a high melt flow polypropylene (HMF-PP),
   7 to 25 wt.-% of a styrenic block copolymer (SBC) and
   15 to 25 wt.-% of a mineral filler (F), wherein
   (a) the heterophasic propylene copolymer (H-PP1) has a xylene cold soluble (XCS) content measured according to ISO 6427 in the range of 22.0 to 50.0 wt.-% and comprises
      (a1) a polypropylene matrix (M1) and
      (a2) an elastomeric copolymer (E1) comprising units derived from
         propylene and
         ethylene and/or C$_4$ to C$_{12}$ α-olefin,
   (b) the melt flow rate MFR$_2$ (230° C.) measured according to ISO 1133 of the high melt flow polypropylene (HMF-PP) is higher than the melt flow rate MFR$_2$ (230° C.) measured according to ISO 1133 of the heterophasic propylene copolymer (H-PP1), and
   (c) the high melt flow polypropylene (HMF-PP) has melt flow rate MFR$_2$ (230° C.) measured according to ISO 1133 from 60.0 to 1000.0 g/10 min.

2. Composition according to claim 1, wherein the heterophasic propylene copolymer (H-PP1) has a melt flow rate MFR$_2$ (230° C.) measured according to ISO 1133 in the range of 3.0 to 30.0 g/10 min.

3. Composition according to claim 1, wherein the heterophasic propylene copolymer (H-PP1) has
   (a) a total propylene content of 75.0 to 92.0 wt.-% and/or
   (b) a propylene content in the xylene cold soluble (XCS) fraction of 50.0 to 75.0 wt.-%.

4. Composition according to claim 1, wherein
   (a) the intrinsic viscosity (IV) measured in solvent decalin according to ISO 1268-1 of the xylene cold soluble (XCS) fraction of the heterophasic propylene copolymer (H-PP1) is above 2.0 dl/g and/or
   (b) wherein the melt flow rate MFR$_2$ (230° C.) measured according to ISO 1133 of the xylene cold insoluble (XCI) fraction of the heterophasic propylene copolymer (H-PP1) is in the range of 20.0 to 150.0 g/10 min.

5. Composition according to claim 1, wherein the high melt flow polypropylene (HMF-PP) is not degraded.

6. Composition according to claim 1, wherein the heterophasic propylene copolymer (H-PP2) comprising
   (i) a polypropylene matrix (M2) and
   (ii) an elastomeric copolymer (E2) comprising units derived from
      propylene and
      ethylene and/or C$_4$ to C$_{12}$ α-olefin.

7. Composition according to claim 6, wherein the xylene cold soluble (XCS) content of the heterophasic propylene copolymer (H-PP2) measured according to ISO 6427 is
   (a) lower compared to the xylene cold soluble (XCS) content of the heterophasic propylene copolymer (H-PP1) measured according to ISO 6427 and/or
   (b) in the range of 7.0 to 20.0 wt.-%.

8. Composition according to claim 7, wherein the heterophasic propylene copolymer (H-PP2) has
   (a) a total propylene content 85.0 to 96.0 wt.-%, and/or
   (b) a higher total propylene content compared to the heterophasic propylene copolymer (H-PP1) and/or
   (c) a propylene content in the xylene cold soluble (XCS) fraction of 50.0 to 75.0 wt.-%.

9. Composition according to claim 7, wherein the intrinsic viscosity (IV) measured in solvent decalin according to ISO 1268-1 of the xylene cold soluble (XCS) fraction of the heterophasic propylene copolymer (H-PP2) is below 3.0 dl/g.

10. Composition according to claim 1, wherein the styrenic block copolymer (SBC) has
    (i) a styrene content equal or below 20 wt.-%, and/or
    (ii) has a melt flow rate MFR (230° C./5.0 kg) of at least 8.0 g/10 min, and/or
    (iii) a density of equal or below 0.910 g/m$^3$.

11. Composition according to claim 1, wherein the mineral filler (F) is talc.

12. Composition according to claim 1, wherein the composition comprises additionally high density polyethylene (HDPE).

13. Composition according to claim 1 used in the manufacture of an automotive article.

14. Composition according to claim 1, wherein the mineral filler (F) is talc comprising a particle size distribution d95 in the range of 1 to 20 μm.

* * * * *